United States Patent [19]

Fisher et al.

[11] 4,065,913
[45] Jan. 3, 1978

[54] SAFE CUTTER DISC ASSEMBLY FOR ROTARY LAWN MOWER

[75] Inventors: Gerald C. Fisher, Shelby, Ohio; Joseph E. Scanland, Savannah, Ga.

[73] Assignee: Roper Corporation, Kankakee, Ill.

[21] Appl. No.: 766,377

[22] Filed: Feb. 7, 1977

Related U.S. Application Data

[63] Continuation-in-part of Ser. No. 611,347, Sept. 8, 1975, abandoned.

[51] Int. Cl.² ............................................ A01D 55/18
[52] U.S. Cl. .................................................... 56/295
[58] Field of Search ............ 56/295, 255, 400, 400.01, 56/400.1, 400.03, 12.7; 172/15

[56] References Cited

U.S. PATENT DOCUMENTS

| | | | |
|---|---|---|---|
| 197,825 | 12/1877 | Campbell | 56/400.01 X |
| 816,486 | 3/1906 | Long | 56/400.01 |
| 2,557,598 | 6/1951 | Daggett | 56/295 X |
| 2,888,993 | 6/1959 | Dunning | 172/15 |
| 3,018,602 | 1/1962 | Diesterweg | 56/295 |
| 3,104,510 | 9/1963 | Voigt | 56/295 |
| 3,176,455 | 4/1965 | Buchanan | 56/295 |
| 3,320,732 | 5/1967 | Kirk | 56/295 |
| 3,474,608 | 10/1969 | Frick | 56/295 |
| 3,826,068 | 7/1974 | Ballas et al. | 56/12.7 |
| 3,900,071 | 8/1975 | Crawford | 172/15 |

*Primary Examiner*—Russell R. Kinsey
*Attorney, Agent, or Firm*—Leydig, Voit, Osann, Mayer & Holt, Ltd.

[57] ABSTRACT

A safe cutter disc assembly for a rotary lawn mower in which the disc has a circular central portion and an annular outer portion joined by a shallow vertically extending wall having a plurality of radially extending openings. The cutting elements are in the form of cutter pins inserted in the openings, each pin in the preferred embodiment being formed of durable plastic having a head, a relatively stiff shank and a long tapering flexible tip portion, the pins being supported cantilever fashion with respect to the openings. The annular outer portion of the disc closely underlies and protects the relatively stiff shank portions of the pins while the tips of the pins project beyond the periphery of the disc into engagement with the grass, bending back into the projection of the outer portion of the disc upon striking of an obstruction. Adjacent each of the openings is provided a backstop in the form of an upstanding radial vane having a retreating curvature for engaging and providing lengthwise-distributed support for the associated pin during its backward bend. In an alternate version a pin having shank and tip portions of substantially equal diameter is used.

39 Claims, 12 Drawing Figures

SAFE CUTTER DISC ASSEMBLY FOR ROTARY LAWN MOWER

This is a continuation-in-part of application Ser. No. 611,347 filed Sept. 8, 1975 and now abandoned.

Many designs of cutter blades have been devised, made of plastic or the like, for the purpose of overcoming the hazards of a conventional steel rotary mower blade. Examples are to be found in Frick U.S. Pat. No. 3,474,608 and Voigt U.S. Pat. No. 3,104,510. In the Frick patent flat inserts of plastic or the like are fitted into openings at the edge of a rotary blade member. Voigt discloses a cutter assembly including a blade body having recesses at its ends for supporting flexible plastic elements in a radially extending position, with the elements intended to bend backwardly upon striking an obstruction. However, in both of the prior patents the cutter elements are relatively inflexible in the face of peripherally applied force and are vulnerable to dislodgement or breaking off upon striking of an obstruction. Moreover, the cutting elements disclosed in the prior patents are not particularly efficient in the cutting of grass or weeds. Notwithstanding the fact that the cutter elements are made of plastic, the prior structures are capable of flinging missiles and capable of inflicting serious injury by direct impact upon the foot of the operator or upon the hand of a curious child.

Because of the tightening of safety requirements in mowers and weed cutters of the rotary type there has been recent concentration upon weed cutters employing a thin, relatively flimsy whirling filament of nylon or the like. It will suffice to say that filamentary cutters are ineffective in a thick stand of grass or against heavy or fibrous weed stalks and are subject to constant breakage.

It is accordingly an object of the present invention to provide a cutter disc assembly for a rotary mower which reduces the hazards of steel bladed cutter designs, which reduces the potential of serious injury either by missile or direct impact, and which is, at the same time, highly effective in cutting grass or weeds. It is a more specific object to employ a cutter disc with sockets for mounting cutter elements in the form of plastic pins having relatively stiff shanks terminating in long flexible tip portions. The shank of each pin is anchored inwardly of the edge of the edge of the disc so that only the flexible tip extends beyond the disc for severing grass and weeds with whiplash action but which, by reason of low mass, yields harmlessly when striking any more weighty object. The disc itself, by reason of its circular shape, is incapable of striking a blow. Consequently the safety of the unit far exceeds that of conventional constructions.

It is another object of the present invention to provide a cutter disc assembly which is, in addition, self protecting and in which the cutter elements, instead of being exposed and vulnerable, are shielded and protected against damage or breaking off, even under the most severe conditions, as, for example, encountered in the mowing of a wild area or a vacant lot strewn with heavy debris. It is a more specific object of the present invention to provide a cutter disc assembly in which a plurality of flexibly tipped cutter pins are mounted in registering openings which are spaced sufficiently inside of the disc periphery, with the tip portions of the pins extending beyond the periphery, so that the shank portions of the pins, which are vulnerable in the face of heavy obstructions by reason of relative stiffness, are protected against impact. It is a related object of the invention to provide a self-protecting cutter disc assembly in which cantilever-supported pins, upon striking obstructions are free to bend back toward, or into, the protection of the disc upon which they are mounted, with the edge of the disc limiting the bending to safe degree.

It is a further related object of the invention to provide a safe cutter disc assembly having long flexible plastic pins which are mounted cantilever fashion inwardly of the disc periphery and in which each pin is provided with a backstop having retreating curvature for engaging and providing lengthwise distributed support for the shank portion of the associated pin during its backward bend, which not only avoids concentration of stress but insures against bending beyond the elastic limit. As a result the service life of a pin is greatly extended, and the need for constant renewal, as in filamentary type cutters, is avoided.

It is nonetheless an object of the invention to provide a cutter disc assembly employing radially extending flexible pins held cantilever fashion, but which permits a pin to be removed and replaced by the user, when the tip finally becomes abraded or worn, easily and quickly, without the necessity for using any tools.

It is a related object of the invention to provide a cutter disc assembly which is not only highly efficient and self-protecting, but which, by reason of the resilient yielding of the light, flexible cutter pins upon striking a pebble, piece of glass or similar foreign object, makes it substantially impossible for the object to be ejected, as a missle, from the mower housing. If ejection should, in rare circumstances, occur, the speed of ejection is in any event reduced to a level considerably less than with conventional blades.

It is a general object of the present invention to provide a cutter disc assembly which is truly safe and effective, economically manufactured and easily maintained for a long useful life.

Other objects and advantages of the invention will become apparent upon reading the attached detailed description and upon reference to the drawings in which:

While the invention will be described primarily in connection with a preferred embodiment, it will be understood that we do not intend to be limited to the particular embodiments shown but intend, on the contrary, to cover the various alternative and equivalent constructions included within the spirit and scope of the appended claims.

Figure 1:
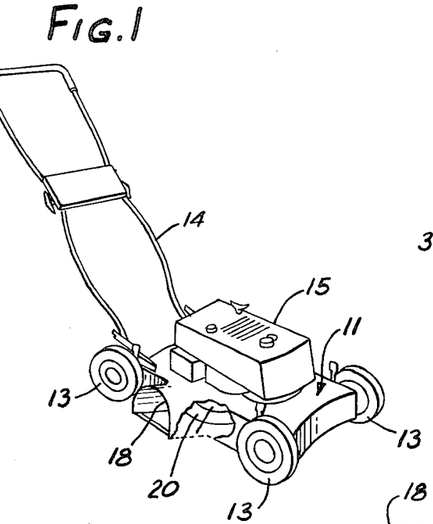
FIG. 1 is a perspective view of a rotary mower including the present invention with a portion of the housing broken away to reveal the cutter disc assembly.
Figure 2:
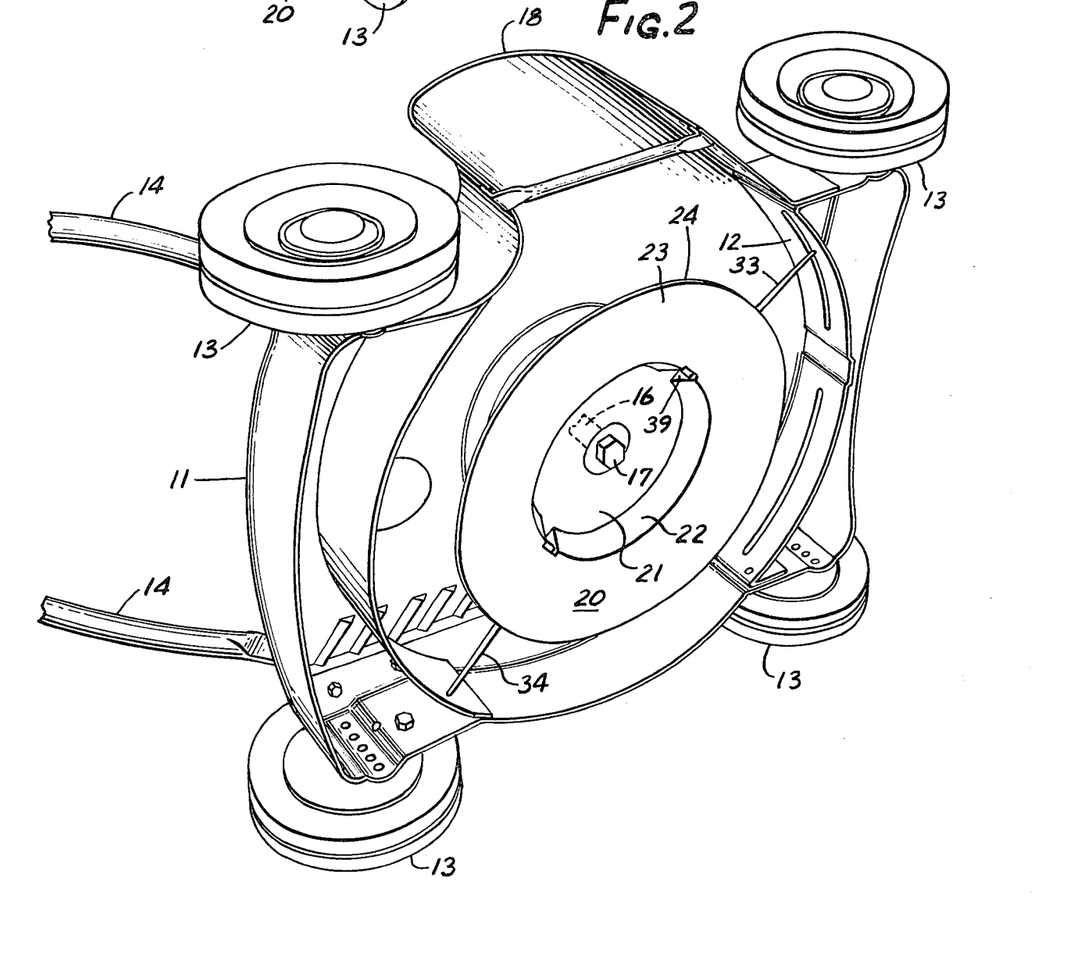
FIG. 2 is a perspective view of the underside of the mower of FIG. 1.

Turning to FIGS. 1 and 2, there is shown a type of rotary mower in common use and to which the present invention is applicable. It includes a frame 11 in the form of a shallow inverted enclosure having an encircling sidewall 12, a set of wheels 13, a handle 14 to provide guidance, and an engine 15 which may, alternatively, be an electric motor, having a vertical drive shaft 16 which is conventionally tapped for receiving a clamping screw 17. A discharge chute 18 projects from one side of the housing to dispose of the clippings.

Figure 3:
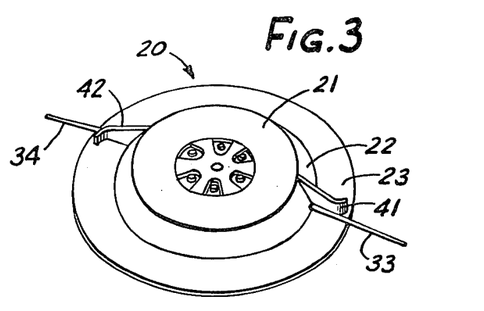
FIG. 3 is a perspective top view of the cutter disc assembly.

Secured to the drive shaft in horizontal position is a cutter disc 20 which carries the cutting elements. Such a disc, which is preferably molded of a durable and resiliently deformable plastic, has a circular central portion 21 (FIGS. 3-5), a shallow wall or offset portion 22 and, at the lower edge thereof, an annular outer portion 23. Secured axially in the center portion 21, to provide durability, is a metallic hub 25 which may, for example, be made of a hard and durable aluminum alloy. The hub, in addition to a central opening 26, has a set of peripheral openings 27 registering with projections 28 formed in the molded piece, which projections are flatted and rounded by action of heat to lock the hub in place at the center of the molding. Evenly spaced, radially extending openings, or sockets, 31, 32 are formed in the shallow wall 22 for receiving cutter pins 33, 34, respectively.

Figure 6:
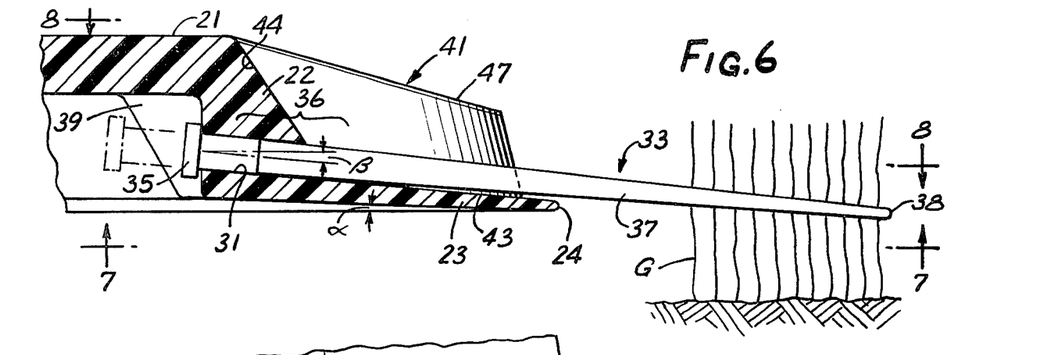
FIG. 6 is an enlargement of a portion of FIG. 5.

Referring to a typical cutter pin 33, as shown in FIG. 6, it includes a head 35, a shank 36 and a long tapering flexible tip portion 37 terminating in an outer tip 38. The shank portion 36 of the pin is dimensioned to fit snugly, cantilever fashion, in the radial opening 31. The opening 31 serves as a mounting means holding the pin in a position in which it is spaced upwardly from the undersurface of the outer portion of the disc. More specifically, the opening 31 is formed in the lower portion of the shallow wall or offset 22 so that the annular outer portion 23 of the disc closely underlies and protects the relatively stiff shank portion of the pin while the tip portion of the pin projects beyond the periphery 24 of the disc into cutting engagement with the grass G. Because the shank 36 of the pin 33 is spaced well inwardly of the periphery 24 of the disc, approximately one-half of the length of the pin being included within the disc perimeter, the shank of the pin is completely shielded against radially ecountered obstructions, the tip portion 37 of the pin being free to bend back toward, or into, the protection afforded by the disc upon striking of an obstruction. At the same time, the shank of the pin, by reason of its position above the underside of the disc, is shielded against obstructions which engage the disc axially. While about one-half of the length of the pin extends beyond the perimeter of the disc, preferably the length of the pin is at least one and one-half times the radial width of the outer portion of the disc utilizing the pin. In any event the pin should project from the disc at least a half inch and preferably at least two inches.

In accordance with one of the aspects of the present invention, there are located adjacent the radial openings 31, 32, upstanding radial vanes 41, 42, respectively, each vane being securely joined to the disc and serving as a backstop for the associated pin, presenting a retreating curvature for engaging and providing lengthwise-distributed support for the associated pin during its backward bend. Thus, taking the vane 41 by way of example (FIG. 6), it has a lower edge 43 which is integrally joined with respect to the peripheral portion 23 of the disc and an inner edge 44 which is integrally joined with respect to the shallow wall 22, thereby providing radial reinforcement for the relatively thin peripheral portion. The upper edge of the vane, indicated at 47 (FIG. 6), is preferably downwardly sloping so that the vane is of shallower height at its outer extremity than it is at its inner edge 44. Such vanes are preferably molded integrally with the disc 20.

Figure 7:
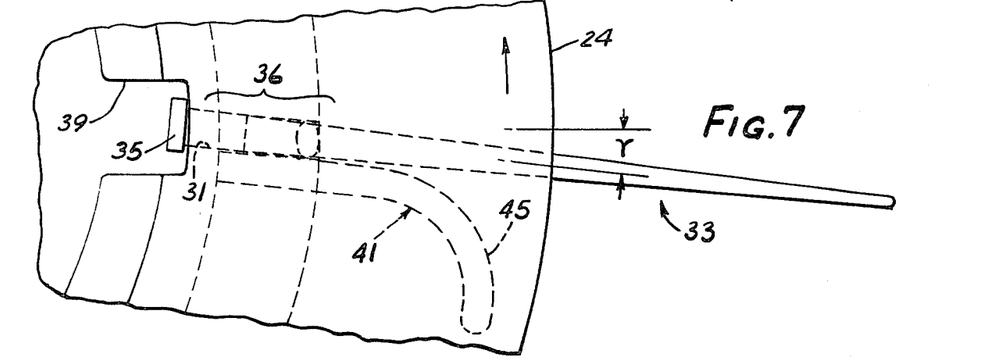
FIG. 7 is an enlarged fragmentary underside view looking along 7—7 in FIG. 6.
Figure 8:
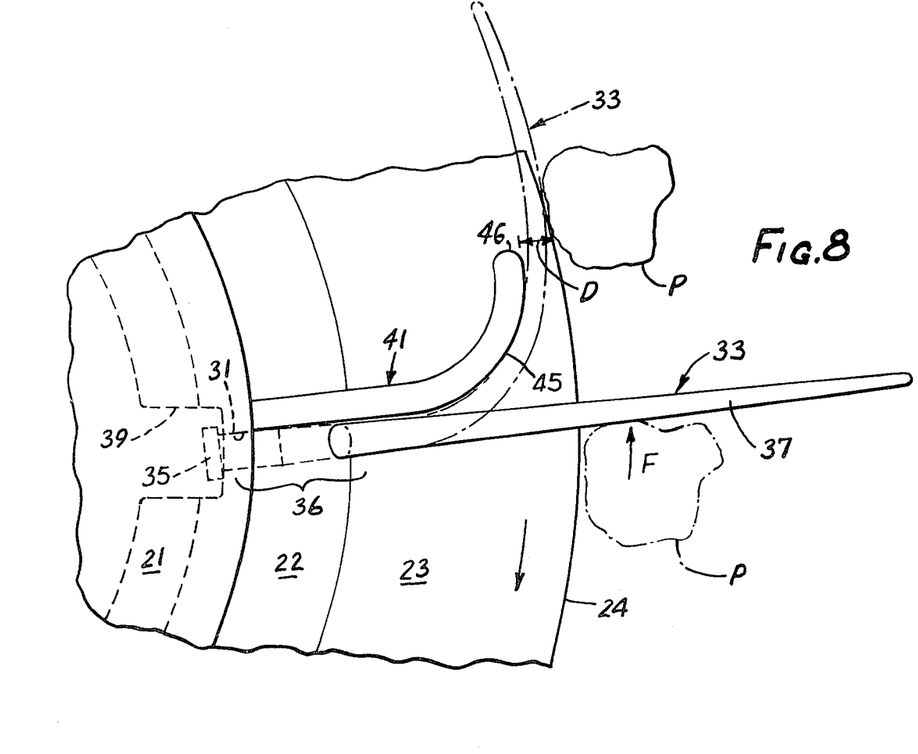
FIG. 8 is an enlarged fragmentary top view looking along line 8—8 in FIG. 6 and showing the bending back of a cutter pin into the protection of the disc upon striking of a weighty obstruction.

In carrying out the invention, the vane is shaped to present a curved face 45 (FIGS. 7 and 8) lying adjacent the pin 33 and which terminates in an end 46 which is spaced inwardly from the periphery 24 by a clearance distance shown at D in FIG. 8. The curvature of the face preferably approximates the cantilever bending curvature of the pin. By cantilever bending curvature of the pin is meant that curvature which is assumed by the pin when the shank of the pin is restrained in cantilever fashion and a force is applied perpendicularly to the tip of the pin.

Thus when an obstruction is encountered, for example, in the form of a rock or pebble P, its mass applies reaction force against the pin 33, causing the pin to be bent back in the most extreme case to the curved position shown "dot-dash" in FIG. 8. Only the tip portion of the pine 33 is accessible to the rock or pebble, and since it is highly resilient, and of low mass, the backward bending takes place to relieve the force before the force, indicated at F, can increase to a degree which might create a flying missile. Because of the tapering section of the pin, the pin itself tends to bend gradually along a bend of increasing curvature as measured from the shank to the tip, thereby avoiding any concentration of stress which, particularly upon repeated flexing, might result in breakage of the pin. Development of a peak stress anywhere along the length of the pin, or stressing of the pin substantially beyond its elastic limit, is moreover prevented by the fact that the curved surface 45 of the vane provides distributed support of adequate radius.

The vane 41 performs a number of functions. In the first place, as stated, it provides lateral support for the pin 33 during its backward bend. Secondly the vane serves to provide radial reinforcement for the disc in the region where the disc is stressed by the reaction force of the pin. Finally, the vane serves as a fan blade to create a more intense draft of air to increase the air flow from the housing and assist in propelling the clippings out of the chute 18 and, if desired, into a bag or receptacle.

For the purpose of promoting radial air flow so that the clippings are blown clear of the disc, it is preferred to form sector shaped through-openings 61 (FIG. 4a) in the central portion 21 of the disc defined by evenly spaced radially extending spokes 62. With the openings 21a spaced fairly close to the center of the disc, air is drawn through the openings upwardly into the space above the disc as the disc rotates, impelled by centrifugal force outwardly over the top surface of the disc and past the radial vanes for discharge at the periphery where the cutting takes place.

Figures 4, 4A:
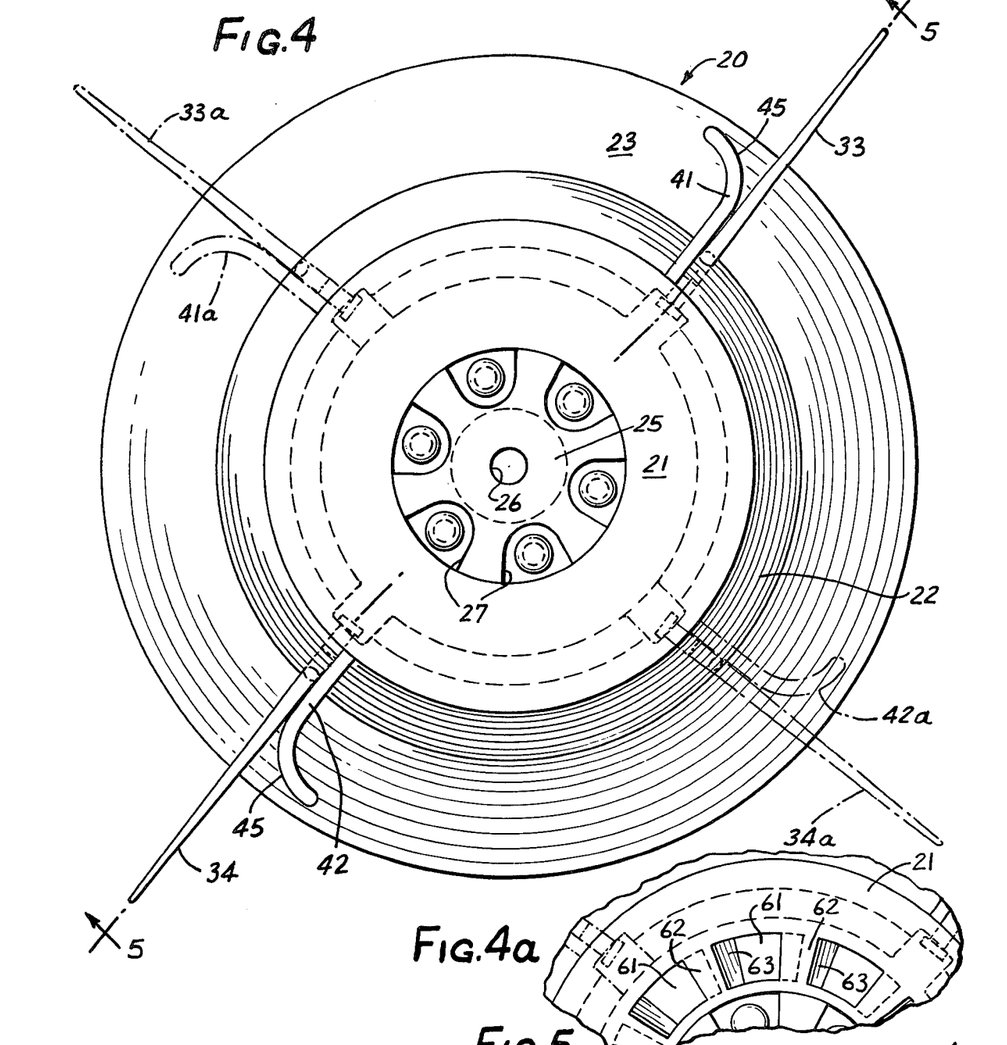
FIG. 4 is a top view of the cutter disc assembly looking along the line 4—4 in FIG. 5.
FIG. 4a is a fragment showing axially-extending openings in the disc.
Figure 5:
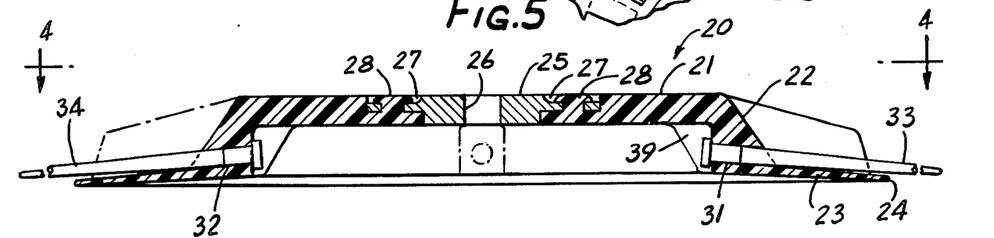
FIG. 5 is a section taken along line 5—5 in FIG. 4.

The radially extending surfaces of the openings are preferably beveled as shown at 63 so that air is forced through the center portion of the disc by scooping action. Since the disc partially encloses the bottom of the shallow enclosure centered in the encircling side wall, a well defined radial draft is created which is strong enough to discharge clippings through the chute 18 and into any bag or receptacle which may be secured to the chute.

While the function has been described in connection with backstop 41, it will be understood that backstop 42, which is diametrically opposite, is symmetrically positioned and acts in the same way. In the preferred form of the invention two cutter pins 33, 34 are used. However, the invention is not limited to use of two cutter pins and either a single cutter pin may be used or additional cutter pins may be spaced about the periphery of the disc, for example, cutter pins 33a, 34a with their associated backstops 41a, 42a (FIG. 4).

As one of the features of the present construction, the annular outer portion 23 of the disc, and the openings (for example opening 31) which register the pins, are not oriented perfectly horizontally but are, instead, angled downwardly at a shallow angle. The bottom surface of the disc may be angled downwardly by an angle $\alpha$ (FIG. 6) of at least 1° but preferably 2° or more to form a shallow conical surface (see FIG. 6), while the opening 31, and hence the pin which it contains, is angled downwardly by a slightly greater angle $\beta$ which may be on the order of 2° to 8°, and preferably 4° to 5°, the difference between $\alpha$ and $\beta$ preferably being no greater than 3°. As a result, the outer tips of the pins lie at a lower level than the periphery 24 of the disc, to insure that cutting takes place at lower than disc level. Thus it is not necessary for the disc to drag or brush against the standing blades of grass in the cut condition. This, in turn, reduces the effort required to push the mower.

It is a further feature of the present invention that the pins are not only angled downwardly but are angled retreatingly, that is, opposite to the direction of rotation of the disc, by an angle $\gamma$ with respect to the radius as shown in FIG. 7, which angle is in the range of from 1° to 9° and preferably on the order of 6°.

It will be apparent in view of the above that the cutting pins are protected in at least two different ways. Because of the closely underlying annular portion 23 of the disc, any obstructions which may be encountered by the mower either radially or axially of the disc are prevented from having access to the shank portions of the pins which are relatively stiff and thus subject to breakage, if unprotected. Conversely any obstruction is limited to engagement by the light, highly flexible tip portion of the pin which, bending backwardly about its backstop and into the confines of the disc, simply lets the object go by without developing a force capable of converting the object into a hazardous missile. To minimize transfer of momentum from the flexible cutting element, the weight of the projecting tip portion should be kept low, for example, below about 2 grams.

It has been found preferable to use a type of plastic for the cutting pins 33, 34 which is highly flexible in thin section, which resists surface abrasion, which has a high impact strength, and which is capable of repeated stressing without fatigue. Nylon, manufactured, for example, by E. I. duPont de Nemours possesses the above characteristics in desired combination. However, it is found that nylon is not the only material which can be successfully employed and delron (acetyl homopolymer), also manufactured by duPont, may be successfully used. Lexan (polycarbonate) and Noryl (phenylene oxide), both manufactured by General Electric Company, are also plastics having high performance characteristics and which may be expected to have a long life in the present usage. Common varieties of polyethylene and polypropylene will also serve and have the advantage of economy. The plastic materials which have thus far been acceptable for cutter pins have the following minimum mechanical properties: tensile strength 8,000 psi.; compressive strength 11,000 psi.; flexural yield strength 6,000 psi.; and flexural modulus 100,000 psi.

In carrying out the invention, the disc itself has been manufactured from plastic materials having characteristics comparable to those materials used in the cutter pins and capable of resisting abrasion while resiliently deforming, for purposes of self-protection, in the face of suddenly applied impact as, for example, upon the striking of a sharp embedded object when rotating at rated speed. Thus the same materials may be used as listed above for the pins. A typical disc, in a push type mower powered by a 3 horsepower engine and designed to cut a 20 inch wide swath, is 14 inches in diameter with two cutter pins mounted in the disc as shown in FIG. 2, each pin being about six inches long, and such a disc and pin assembly may have rotational inertia comparable to that of the usual steel blade. Such a disc, with pins installed to make the effective cutting width 20 inches has been operated at a rotational speed on the order of 3,000 rpm. and was found capable, in heavy grass or weeds, of fully utilizing the rated horsepower of the usual (3HP) engine, with the pins automatically yielding under load to prevent overloading, or lugging, of the engine upon engagement of heavily wetted vegetation. Thus the construction may be distinguished from the structures of Frick and Voigt, mentioned above, in which overloading, and even stalling of the engine is possible. The construction is distinguished, by equal margin, over whirling filament cutters which are suited primarily to hand held trimmers.

While it is preferred to make the pins out of plastic or other low density material, for example, by a molding process, the invention is not limited thereto and the pins may if desired be of a composite construction formed, for example with a flexible central core, or reinforcement, of piano wire embedded in a suitable abrasion-resistant plastic. By use of such composite construction a pin may be formed having an optimum combination of abrasion resistance and flexural properties.

While a pin made of durable plastic, inherently protected by the disclosed disc construction, may be expected to have a long life, it is one of the features of the present invention that any pin may be replaced, without special tools, in a few seconds time. The head 35 of the pin, protected in its recess 39, may simply be pushed inwardly by grasping the outer end of the pin, without use of tools, or may be pried by any edged tool such as a screwdriver toward the dotted position shown in FIG. 6. Once the shank portion 36 has been loosened, the pin may be retracted radially inwardly by the fingertips, and a new pin substituted. While the portion of the shank adjacent the head is preferably of cylindrical shape, having a light press fit with respect to a cylindrical opening 31, it will be apparent to one skilled in the art that the shank and hole may be made with shallow mating conical surfaces to facilitate extraction. Very little retentive force is required since centrifugal force acts to keep the pin seated during rotation and since obstructions striking the outer flexible portion of the pin act to bend the pin backwardly without applying to it any radially inward, unseating component. The action is to be contrasted with prior mowers using replaceable cutting elements where the cutting elements are susceptible to serious damage or dislodgement upon striking the many possible types of obstructions which may be encountered.

While it is preferred to employ a pin such as disclosed in FIG. 6 having an enlarged head with a cylindrical shank portion adjacent thereto and a long flexible tip portion of constant taper, it will be apparent to one skilled in the art that the invention is not limited to the particular shape which is disclosed. Indeed, instead of using a constant taper providing a sharp conical shape, with straight convergent sides, the sides may be slightly concaved, or even slightly convexed if desired. Because of the variations in shape the terms "shank portion" and "tip portion", as applied to a given structure, may shift or overlap. Generally stated, the shank portion is the portion which is adjacent the head and which is relatively stiff and unyielding whereas the tip portion may be defined as that portion over which the taper occurs which will normally extend from the tip to within the confines of the periphery 24 of the disc. By taper is meant gradual reduction in area free of any abrupt changes in cross section. The diameter of the tip portion, near the outer extremity of the pin, is, for the most common size of mower, on the order of 0.050 to 0.125 inch, preferably about 0.09 inch, providing a cross sectional area of about 0.0064 square inch. Pins having a shank diameter of about 0.250 to 0.375 inch have been used, corresponding to a cross sectional area of about 0.049 to about 0.110 square inch. The average thickness of the pin should preferably be greater than 0.20 inch. In the case of a tapered pin, the shank of the pin should have a cross sectional area which is at least four, and preferably about five to ten, times that at the tip. The size of the pin may be scaled downwardly, in proportion, for a hand held weed trimmer, or may be scaled upwardly, for heavy work, where higher horsepower is available.

While the pin 33 is preferably rounded in cross section, it will be apparent that the invention is not limited thereto and the cross section may be oval, square, or even somewhat rectangular provided that a high degree of flexibility is obtained and without substantially affecting the "whiplash" cutting and flexing qualities. The term "head", while preferably denoting an enlargement adjacent the shank for maintaining the pin captive against centrifugal force, is not necessarily limited to an enlargement and is intended, more generally, to denote the inner end of the pin, provided that suitable retaining means are used to hold the pin anchored in the disc. Thus it is possible, within the scope of the invention, even though not preferred, for the head portion of the pin to be threadedly retained in its registering opening. The term "plastic" includes tough flexible materials having a density characteristic of synthetic plastics in general, exhibiting abrasion resistance equivalent to the high performance synthetic materials already mentioned and capable of self-restoration to substantially radial position after bending at right angles around a curved backstop.

It will be understood that the term "vane" as used herein is not necessarily limited to a radial member of thin section and the term is intended to include any member extending in a generally radial direction and presenting a supporting surface permitting the pin to adopt a curvature free of concentrated stress. Moreover, while a support vane having a curved surface has been employed as a preferred form of backstop, it will be understood that the backstop function may be performed by a single more concentrated abutment or by series of closely spaced abutments lying in a curved locus rather than by a single continuous surface.

The invention has been described in connection with a rotary lawn mower where it finds greatest utility, being sufficiently versatile as to be used in rotary mowers already in the field as well as in new designs of rotary mowers, replacing in each the sharpended steel blade which has for many years been used as a standard cutting element. Thus the term "mower" as used herein includes weed cutters, trimmers and edgers for example of the light hand-held type powered by an electric motor. In such usage the present construction excels devices of the whirling filament type which are not as effective for heavy cutting and in which the filament is subject to repeated breakage.

In the preferred form of the invention, for example as described in connection with FIG. 8, provision is made for substantially the entire tip portion of the pin to flex to a position within the protected confines of the periphery of the disc upon the striking of a weighty obstruction. However, it will be understood that the invention is not limited to a construction in which the entire length of the pin may be thus accommodated, and the peripheral clearance, indicated at D in FIG. 8, may if desired be reduced to less than that shown without departing from the present invention.

Figure 9:
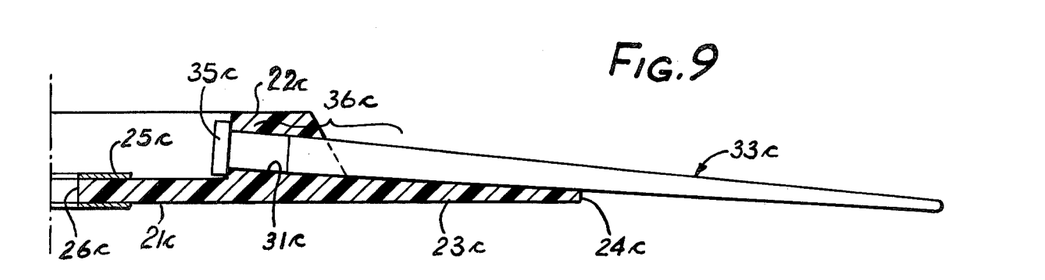
FIG. 9 is a partial section similar to FIG. 6 but showing a modified structure.

Also in the preferred form of the invention, and to facilitate replacement of the pins when replacement becomes necessary, the outer, or peripheral, portion of the disc is shown in the drawings and stated to be at a lower level than the circular central portion. In the broader aspect of the invention it is not essential that these two portions be at a different level and they may, indeed, be at the same level and form a radial continuation of one another provided that there is an axially offset portion at the junction between the central portion and outer portion providing a plurality of radially extending openings for registration of tapered pins, with the shanks of the pins being held, cantilever fashion, adjacent the head in a protected position extending just above the outer portion of the disc. Such a structure is shown in FIG. 9 in which the same reference numerals as in FIG. 6 have been used to designate similar parts with addition of subscript "c". Such construction may be used with or without backstop vanes, such as integral vanes 41, 42.

The version shown in FIG. 9 possesses the same general advantages as the earlier version except that the pins are not quite so readily replaceable, requiring removal of the disc; such captivity may be considered as an advantage in some applications. The wall 22c is preferably annular.

Figure 10:
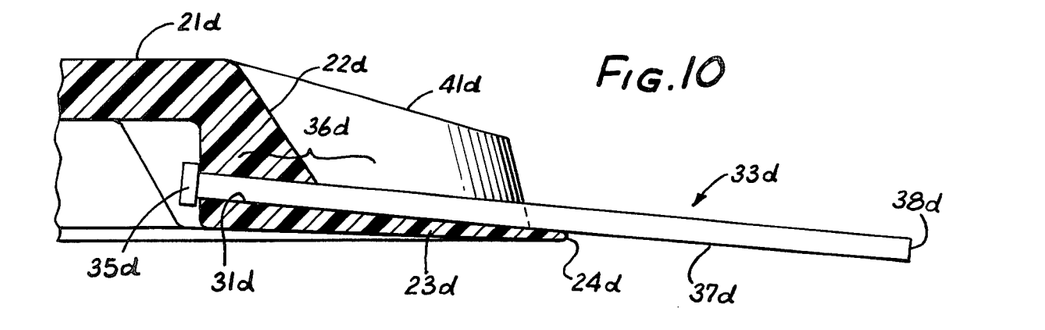
FIGS. 10 and 11 correspond to FIGS. 6 and 8 but show substitution of a straight-sided pin as a modification of the invention.
Figure 11:
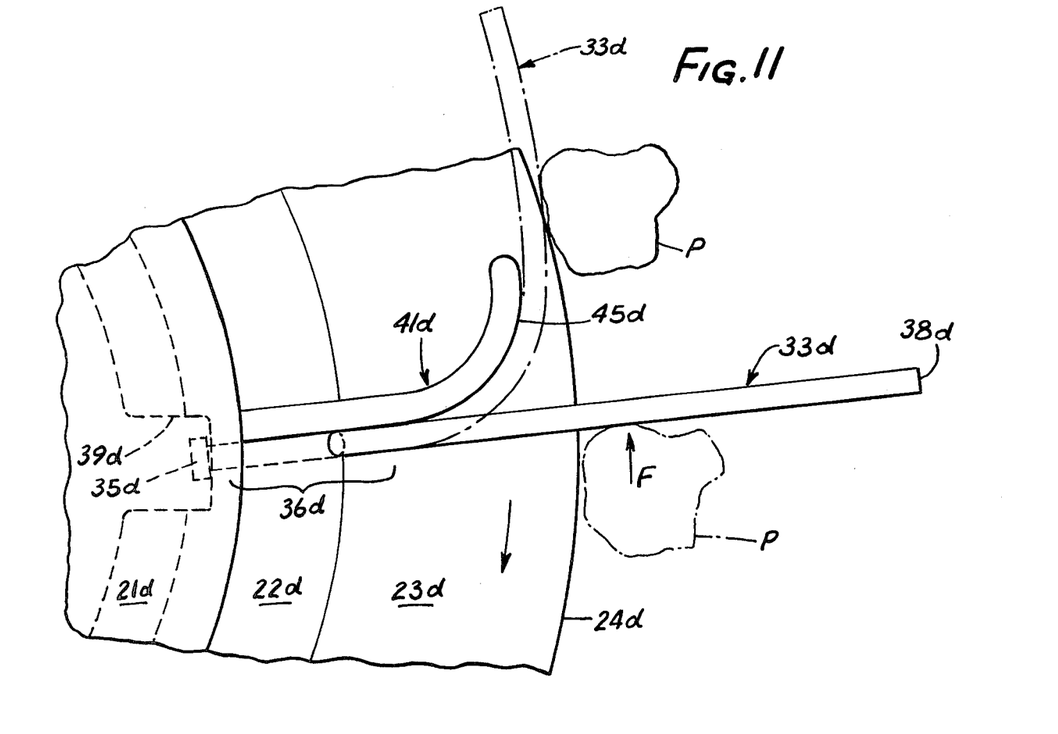

One of the features of the preferred form of the invention, emphasized above, has been the fact that each pin is of tapered configuration, providing a high degree of flexibility and low mass at the tip but with a shank of relatively larger diameter resulting in a natural cantilever bending curvature which increases from shank to tip. However, it is understood that the invention may be practiced, if desired, employing a cutter pin which is of substantially constant thickness, combined with a curved vane, or backstop, to prevent concentration of bending stress. Such a "parallel-sided" pin is illustrated in FIGS. 10 and 11 which correspond to FIGS. 6, 7 and 8 of the earlier embodiment, similar reference numerals being employed with addition of subscript "d". In the alternate embodiment, as in the earlier ones, the tip is protected by bending retreatingly toward, or into, the confines of the disc periphery, the main difference being that the very tip of the pin tends to remain more straight than in the case of the tapered pin. One advantage of the parallel-sided pin is that the pins may be produced easily and cheaply by extrusion, with the head being formed, for anchoring purposes, by a separate terminal "heading" operation. A further advantage of the modified construction is that there is more material available for wear and abrasion at the tip, which may be desirable when using the mower for heavy weeds, brush and the like, either with or without an increase in driving horsepower.

While it is preferred to employ a wall for mounting the pins which is of continuous, annular shape, it will be understood by one skilled in the art that the wall may be non-circular for example, of polygonal shape if desired. Also the wall may be discontinuous, that is, in the form of a short segment of a circle or polygon and either curved or straight without departing from the invention. Thus the term "circular center portion" of the disc refers generally to that portion which immediately surrounds the hub and which need not be circularly bounded by the wall. Indeed, the term "wall" refers to any upstanding structure means on the disc, either integral with the disc or not, for engaging and thus rigidly securing to the disc, in generally radial position, the shanks of the respective pins. Similarly, the term "annual outer portion" of the disc is directed to a portion having an outer edge which, unlike that of the prior art Voigt patent, has a sufficiently gradual curvature so that it is impossible for the outer edge of the rotating element to strike a hammer blow against a pebble or piece of debris sufficient to turn the same into a missile.

It will be apparent that the pin which constitutes an important part of the present invention is to be clearly distinguished over the flexible nylon filament used in conventional safety type mowers. A filament, by its nature, is relatively flimsy and easily bendable and must rely upon centrifugal force to keep it in a reasonably extended position during actual cutting. To develop such centrifugal force requires rotation at speeds higher than those of the conventional steel cutter bar. The present cutter pin, being sufficiently stiff so as not to require reliance on centrifugal force to keep it extended in cutting engagement with the grass, cuts efficiently at conventional speeds on the order of 3000 rpm. As a result of reliance upon centrifugal force a flexible filament adopts a sharply angled-back cutting position in reaction to cutting force, the degree of such "layback" being dependent upon the density and toughness of the growth. The layback not only causes the cutting width to vary, depending upon what is being cut and the forward speed, but the layback may reach a point where cutting action becomes minimal. The present pin, in contrast, is relatively much stiffer and is cantilever-supported, beam-like, in radial cutting position, without reliance upon centrifugal force, being bent to only a slight degree by normal reaction forces exerted by the grass which is being cut; thus the cutting width varies only slightly over widely different grass conditions and within the range of normal pushing speed. Indeed, the present pin yields backwardly to a substantial degree only while striking an obstruction or in the face of heavily matted vegetation. And since the present cutting assembly does not rely on centrifugal force for cutting action, variations in driving speed have less effect upon the efficiency of the cut. Also, while a filament supportingly bends around the rounded surface of an exit opening during normal cutting, the pin of the present invention undergoes little if any bending about a backstop in the face of normal cutting reaction. And while a flexible filament, even when mounted with its inner end held in a downwardly-angled position, will straighten out, under centrifugal force, into horizontal position, the pin of the preferred embodiment remains downwardly angled during cutting, for severing of the grass below, or substantially at, disc level in spite of the force tending to swing it upwardly into a horizontal plane.

It can be readily ascertained whether there is reliance upon centrifugal force by measuring the grass cutting reaction force existing at a pin under the dynamic conditions of normal cutting and then applying such force artificially to the cutting element in the stationary state, noting the degree of bend. The present pin will remain radially extended in an efficient cutting posture, bending backwardly only slightly, while a flexible filament will bend backwardly into an inefficient or non-cutting condition.

What is claimed is:

1. A safe cutter disc assembly for a rotary lawn mower of the type having a shallow inverted enclosure comprising, in combination, a disc having a circular central portion and an annular outer portion, the annular outer portion being downwardly offset and connected to the central portion by means of a shallow vertically extending wall, at least the annular portion being formed of resiliently deformable plastic, a plurality of spaced radially extending openings being provided in the wall, cutter pins registered in the respective openings, said cutter pins being formed of durable plastic, each pin having a head with a relatively stiff shank, the shank adjacent the head being dimensioned to fit in the associated opening and each pin having a long tapering flexible tip portion, the wall of the disc having substantial radial thickness for rigid support of the pins cantilever fashion, the wall of the disc having a relatively shallow vertical dimension so that the annular outer portion of the disc closely underlies and protects the relatively stiff shank portions of the pins while the tip portions of the pins project beyond the periphery of the disc into cutting engagement with the grass and are free to bend back into the protection of the annular outer portion of the disc upon striking of an obstruction, and backstop means on the annular portion of the disc adjacent the openings for engaging and supporting the pins during this backward bend, the pin being of sufficiently thick dimension over the shank portion that the pin is supported beam-like adjacent its head end, in radial position by the wall of the disc as the disc revolves during mowing free from reliance upon centrifugal force to hold the pin outwardly in cutting engagement with the grass and thus capable of performing a typical mowing operation at conventional rotative speeds on the order of 3000 rpm.

2. The combination as claimed in claim 1 in which the shank of each pin has a cross sectional area at least about four times greater than the cross sectional area of the tip of the pin.

3. A safe cutter disc assembly for a rotary lawn mower comprising, in combination, a disc having a circular central portion and an annular outer portion, the annular outer portion being downwardly offset and connected to the central portion by means of a shallow vertically extending wall, a plurality of evenly spaced radially extending openings being provided in the wall, cutter pins registered in the respective openings, said cutter pins being formed of durable plastic, each pin having an enlarged head with a relatively stiff shank, the shank adjacent the head being dimensioned to fit in the opening, each pin having a long tapering flexible tip portion, the wall of the disc having substantial radial thickness for rigid support of the pins cantilever fashion, the wall of the disc having a relatively shallow vertical dimension so that the annular outer portion of the disc closely underlies and protects the relatively stiff shank portions of the pins while the tips of the pins project beyond the periphery of the disc into cutting engagement with the grass and are free to bend back into the protection of the annular outer portion of the disc upon striking of an obstruction, the pin being of sufficiently thick dimension over the shank portion that the pin is supported beam-like adjacent its head end, in radial position by the wall of the disc as the disc revolves during mowing free from reliance upon centrifugal force to hold the pin outwardly in cutting engagement with the grass and thus capable of performing a typical mowing operation at conventional rotative speeds on the order of 3000 rpm.

4. The combination as claimed in claim 3 in which the shank of the pin has a cross sectional area at least about four times greater than the cross sectional area of the tip.

5. A safe cutter disc assembly for a rotary lawn mower comprising, in combination, a disc having a circular central portion and an annular outer portion, the annular outer portion being downwardly offset and connected to the central portion by means of a shallow vertically extending wall, a plurality of radially extending openings being provided in the wall, cutter pins registered in the respective openings, said cutter pins being formed of durable plastic, each pin having a head with a relatively stiff shank dimensioned to fit in the opening and having a long tapering tip portion, the wall of the disc having substantial radial thickness with rigid support of the pins cantilever fashion, the openings being formed in the base of the wall so that the annular outer portion of the disc closely underlies and protects the relatively stiff shank portions of the pins while the tips of the pins project beyond the periphery of the disc into cutting engagement with the grass and are free to bend backwardly into the protection of the annular outer portion of the disc upon striking of an obstruction, and backstop means in the form of an upstanding radial vane on the annular outer portion of the disc adjacent each of the openings, each vane having a retreating curvature for engaging and providing lengthwise-distributed support for the associated pin during its backward bend so that stress in the pin is kept substantially within the elastic limit, the pin being of sufficiently thick dimension over the shank portion that the pin is supported beam-like adjacent its head end, in radial position by the wall of the disc as the disc revolves during mowing free from reliance upon centrifugal force to hold the pin outwardly in cutting engagement with the grass and thus capable of performing a typical mowing operation at conventional rotative speeds on the order of 3000 rpm.

6. The combination as claimed in claim 5 in which the curvature approximates the cantilever bending curvature of the pin.

7. The combination as claimed in claim 1 in which the backstop means terminates inwardly of the outer periphery of the annular portion of the disc so as to provide support to the pin during bending thereof while permitting the tip portion to retreat totally within the confines of the annular portion.

8. A safe cutter disc assembly for a rotary lawn mower of the type having a shallow inverted enclosure comprising, in combination, a disc having a central opening and molded of resiliently deformable plastic, the disc having a circular central portion and an annular outer portion, the annular outer portion being downwardly offset and connected to the central portion by means of a shallow vertically extending wall, a plurality of spaced radially extending openings being provided in the wall, cutter pins registered in the respective openings, said cutter pins being formed of durable plastic, each pin having a head and a relatively stiff shank, the shank adjacent the head being dimensioned to fit in the opening, each pin having a long tapering tip portion, the openings being located immediately above the top surface of the annular outer portion of the disc so that such portion closely underlies and protects the relatively stiff shank portions of the pins while the tips of the pins project beyond the periphery of the disc into cutting engagement with the grass and are free to bend back into the protection of the annular portion of the disc upon striking of an obstruction, the annular portion being of substantially thinner cross section than the central portion or the wall, and backstop means in the form of an upstanding radial vane adjacent each of the openings and integrally secured to the wall and to the annular portion for reinforcement of the latter, the pin being of sufficiently thick dimension over the shank portion that the pin is supported beam-like adjacent its head end, in radial position by the wall of the disc as the disc revolves during mowing free from reliance upon centrifugal force to hold the pin outwardly in cutting engagement with the grass and thus capable of performing a typical mowing operation at conventional rotative speeds on the order of 3000 rpm.

9. A cutter disc assembly for a rotary lawn mower comprising, in combination, a disc formed of resiliently deformable plastic having a circular central portion and an annular outer portion surrounding the same, the disc having an axially offset wall portion at the junction between the central portion and the annular outer portion, the offset wall portion providing a plurality of radially extending openings evenly spaced therein, cutter pins registered in the openings, the cutter pins being formed of durable plastic, each pin having a head and a relatively stiff shank, the shank adjacent the head being dimensioned to fit in the opening, each pin having a long tapering tip portion which is flexible and resilient, the wall having substantial radial thickness for rigid support of the pins cantilever fashion, the annular outer portion of the disc closely underlying the relatively stiff shanks of the pins with the tips of the pins projecting radially outwardly from the periphery of the disc for cutting of the grass as the disc is rotated but with the tip portions of the pins being free to bend backwardly into the protective confines of the annular portion of the disc upon striking of an obstruction, the pin being of sufficiently thick dimension over the shank portion that the pin is supported beam-like adjacent its head end, in radial position by the wall of the disc as the disc revolves during mowing free from reliance upon centrifugal force to hold the pin outwardly in cutting engagement with the grass and thus capable of performing a typical mowing operation at conventional rotative speeds on the order of 3000 rpm.

10. A rotary lawn mower as claimed in claim 9 including a frame defining a shallow inverted enclosure having an encircling side wall, driving means including a drive shaft extending downwardly into the enclosure, the disc having a metal hub reinforcingly secured to the central portion of the disc for connection to the drive shaft.

11. The combination as claimed in claim 9 in which the annular outer portion of the disc and the radially extending openings are angled downwardly by a shallow angle so that the tips of the pins project to a level lower than the periphery of the disc to minimize the drag of the cut grass upon the lower surface of the disc.

12. The combination as claimed in claim 9 including backstop means in the form of upstanding radial vanes on the annular portion of the disc adjacent the respective openings, each vane having retreating curvature for engaging and providing lengthwise-distributed support for the associated pin during its backward bend.

13. A safe cutter disc assembly for a rotary lawn mower of the type having a shallow inverted enclosure including an encircling sidewall with driving means including a drive shaft extending downwardly into the enclosure comprising, in combination, a disc integrally molded of resiliently deformable plastic having a central opening for connection to the drive shaft, the disc having a circular central portion, a shallow vertically extending wall, and an annular outer portion extending outwardly from the wall, a plurality of evenly spaced radially extending openings being provided in the wall, cutter pins inserted in the openings, said cutter pins being formed of durable plastic, each pin having a head and a relatively stiff shank, the shank adjacent the head being dimensioned to fit in the opening and each pin having a long flexible tip portion, the tip portion being of sharp conical shape tapering at a substantially constant rate from the shank to the tip, the shank having a cross sectional area at least about four times greater than the area of the tip, the pins having a length of at least about one and one-half times the radial width of the annular outer portion of the disc, the wall of the disc having a relatively shallow vertical dimension so that the annular outer portion of the disc closely underlies and protects the relatively stiff shank portion of each pin while the tips of the pins project beyond the annular outer portion of the disc for engagement with the grass and are free to bend back toward the protection of the annular outer portion of the disc upon striking of an obstruction, and backstop means in the form of an upstanding radial vane on the annular outer portion of the disc adjacent each of the openings, the vane having a retreating curvature for engaging and providing lengthwise-distributed support for the associated pin during its backward bend, the outer extremity of the vane being spaced inwardly by a small amount from the periphery of the disc to accommodate the backward bend of the pin, the pin being of sufficiently thick dimension over the shank portion that the pin is supported beam-like adjacent its head end, in radial position by the wall of the disc as the disc revolves during mowing free from reliance upon centrifugal force to hold the pin outwardly in cutting engagement with the grass and thus capable of performing a typical mowing operation at conventional rotative speeds on the order of 3000 rpm.

14. A safe cutter disc assembly for a rotary lawn mower of the type having a frame and driving means including a drive shaft extending downwardly from the frame comprising, in combination, a disc integrally molded of resiliently deformable plastic having a central opening for connection to the drive shaft, the disc having a central portion, a shallow vertically extending wall, and an annular outer portion outwardly of the wall, a radially extending opening being formed in the wall, a cutter pin inserted in the opening, said cutter pin being formed of durable plastic having a head, a shank portion and a flexible tip portion, the pin having a length of at least about one and one-half times the radial dimension of the annular outer portion of the disc, the wall of the disc having a relatively shallow vertical dimension and the opening therein being formed adjacent the base of the wall so that the annular outer portion of the disc closely underlies and protects the shank portion of the pin while the tip portion projects beyond the annular outer portion of the disc for engagement with the grass, with freedom to bend back toward the protection of the annular outer portion of the disc upon striking of an obstruction, and backstop means in the form of an upstanding projection on the annular outer portion of the disc immediately adjacent the downstream side of the opening, the projection being shaped to provide progressive lengthwise-distributed support for the associated pin during its backward bend thereby to avoid concentration of bending stress in the shank portion of the pin, the pin being of sufficiently thick dimension over the shank portion that the pin is supported beam-like adjacent its head end, in radial position by the wall of the disc as the disc revolves during mowing free from reliance upon centrifugal force to hold the pin outwardly in cutting engagement with the grass and thus capable of performing a typical mowing operation at conventional rotative speeds on the order of 3000 rpm.

15. A cutting assembly for a rotary mower, comprising:
   a. a cutting element carrier having a central portion, an outer portion attached to and located radially outwardly from the central portion, and cantilever mounting means located at the junction between the central and outer portion for securing a cutting element to the cutting element carrier approximately on a radius of the carrier in a cantilever manner; and
   b. the cutting element being flexible and resilient and having a shank portion, an outer tip, and a tapered portion interposed between the shank portion and the outer tip, the shank portion having a substantially larger cross sectional area than the tip, the shank portion being secured to the carrier by the cantilever means, whereby the tapered portion assumes a curvature having an ever increasing rate when a force is applied at the tip of the cutting element with the shank portion being cantilever mounted;
   c. the cantilever mounting means locating the cutting element above and adjacent to the outer portion of the carrier;
   d. the cutting element having a length sufficient so that the tip thereof extends beyond the periphery of the outer portion, thereby defining a tip extension, in the region of the cutting element when the shank portion is secured by the cantilever mounting means e. the pin being of sufficiently thick dimension over the shank portion that the pin is supported beam-like adjacent its head end, in radial position by the cantilever mounting means as the disc revolves during mowing free from reliance upon centrifugal force to hold the pin outwardly in cutting engagement with the grass and thus capable of performing a typical mowing operation at conventional rotative speeds on the order of 3000 rpm.

16. The cutting assembly claimed in claim 15 wherein the cutting element is angled downwardly so that the tip of the cutting element projects to a level lower than the outer periphery of the outer portion to minimize the drag of the cut grass upon the lower surface of the carrier.

17. The cutting assembly claimed in claim 16 wherein the outer portion of the carrier is angled downwardly.

18. The cutting assembly claimed in claim 17 wherein the downward angle of the cutting element is greater than the downward angle of the outer portion.

19. The cutting assembly as claimed in claim 15 wherein the cutting element is angled retreatingly from the direction of rotation of the carrier.

20. The cutting assembly claimed in claim 15 wherein a shallow vertically extending wall is interposed between the central portion and the outer portion, the cantilever mounting means being a radially extending opening in the wall, the opening being dimensioned to correspond to the dimensions of the shank portion of the cutting element, whereby the cutting element is cantilever mounted in the opening.

21. The cutting assembly claimed in claim 20 wherein the wall extends from the outer periphery of the central portion to the inner periphery of the outer portion, whereby the outer portion is downwardly offset from the central portion.

22. A safe cutter disc assembly for a rotary lawn mower comprising, in combination, a disc having a central portion and an annular outer portion surrounding the same, the disc having an axially offset wall portion at the junction between the central portion and the outer portion, a plurality of radially extending openings being provided in the wall, cutter pins registered in the respective openings, said cutter pins being formed of durable highly resilient plastic, each pin having a head with an adjacent shank dimensioned to fit in the opening and having a long flexible tip portion, the wall of the disc having substantial radial thickness for rigid support of the pins cantilever fashion, the openings being formed in the base of the wall and the wall being spaced substantially inwardly from the periphery so that the annular outer portion of the disc closely underlies and protects the shank portions of the pins while the tips of the pins project beyond the periphery of the disc into cutting engagement with the grass and are free to bend backwardly toward the protection of the annular outer portion of the disc upon striking of an obstruction, and an upstanding radial backstop on the annular outer portion of the disc adjacent each of the openings, each backstop presenting a retreating curvature for engaging and providing lengthwise-distributed support for the associated pin during its backward bend, the pin being of sufficiently thick dimension over the shank portion that the pin is supported beam-like adjacent its head end, in radial position by the wall of the disc as the disc revolves during mowing free from reliance upon centrifugal force to hold the pin outwardly in cutting engagement with the grass and thus capable of performing a typical mowing operation at conventional rotative speeds on the order of 3000 rpm.

23. The combination as claimed in claim 22 in which each backstop is in the form of an upstanding smoothly curved vane surface having a terminal portion which is approximately parallel to the periphery of the disc.

24. The combination as claimed in claim 22 in which the terminal portion of each vane surface is spaced radially inwardly from the periphery by a sufficient distance to permit protective accommodation of the associated backwardly bent pin substantially within the confines of the periphery.

25. The combination as claimed in claim 22 in which the pin has an average diameter of at least 0.20 inch and in which each vane surface has a radius of curvature which is sufficiently great so that the stress developed in the associated pin in bending through the angular range of the vane does not substantially exceed the elastic limit of the material in the pin.

26. The combination as claimed in claim 22 in which the cutter pins project radially from the periphery a distance within the range of one-half to three inches.

27. The combination as claimed in claim 26 in which the radius of curvature of the backstops is sufficiently great so that the pins are stressed within the elastic limit upon bending substantially at right angles upon striking an obstruction so that following such bending the pins tend to return to a substantially radial position.

28. A safe cutter disc assembly for a rotary lawn mower of the type having a frame and driving means including a drive shaft extending downwardly from the frame comprising, in combination, a disc having a central opening for connection to the drive shaft, the disc having a central portion and an annular outer portion of thin cross section, a cutter pin having a head, a shank portion and a flexible tip portion, means for securing the pin to the disc, the securing means being spaced substantially inwardly from the periphery of the disc, the securing means having a provision for engaging the shank of the pin so that the tip portion of the pin extends beyond the disc periphery for engagement with the grass, the securing means further having provision for holding the shank cantilever fashion in a radial position to prevent bodily swinging of the pin while permitting flexing of the tip portion in response to reaction force, the securing means and pin being so located that the annular outer portion of the disc closely underlies and protects the pin while permitting the pin to bend back toward the protection of the annular outer portion of the disc upon striking of an obstruction, the pin being of sufficiently thick dimension over the shank portion that the pin is supported beam-like adjacent its head end, in radial position by the securing means as the disc revolves during mowing free from reliance upon centrifugal force to hold the pin outwardly in cutting engagement with the grass and thus capable of performing a typical mowing operation at conventional rotative speeds on the order of 3000 rpm.

29. The combination as claimed in claim 28 in which the pin is secured cantilever-fashion pointing downwardly at a shallow angle with respect to a plane perpendicular to the disc axis, the angle lying within the range of two to eight degrees, so that the tip of the pin extends downwardly beyond the lower surface of the disc to minimize the drag of the cut grass upon the lower surface of the disc.

30. The combination as claimed in claim 28 including backstop means in the form of an upstanding projection on the disc adjacent the downstream side of the pin, the projection being spaced from the radial position of the pin to provide support for the pin during the course of its backward bend thereby to avoid concentration of bending stress in the shank portion of the pin.

31. The combination as claimed in claim 28 including backstop means in the form of an upstanding projection on the annular outer portion of the disc immediately adjacent the downstream side of the pin, the projection being shaped to provide progressive lengthwise-distributed support for the pin during its backward bend thereby to avoid concentration of bending stress in the shank portion of the pin, the backstop means being so positioned on the disc as to enable the pin to flex backwardly upon striking an obstruction until substantially the entire pin is protectively within the periphery of the disc.

32. The combination as claimed in claim 28 including a shallow inverted enclosure including an encircling side wall defining an open bottom, the disc being positioned to partially enclose the open bottom, the disc having axially extending openings for admission of air to the top surface of the disc for flow outwardly therefrom by centrifugal force with discharge at the disc periphery as the disc rotates.

33. A safe cutter disc assembly for a rotary lawn mower having a vertical drive shaft comprising, in combination, a disc having a provision for connection to the lower end of the drive shaft, the disc having an annular outer portion presenting a generally flat surface on its underside, at least one cutter pin on said disc arranged generally radially thereon, each pin being made of tough, resilient abrasion-resistant material and having a head and a shank and terminating in a long flexible tip portion, mounting means on the disc for engaging and supporting the shank of each pin cantilever-fashion adjacent the head and at a region which is spaced inwardly from the periphery of the disc so that only the tip portion of the pin projects radially outwardly of the periphery for cutting of the grass as the disc is rotated, the disc having a smoothly curved backstop surface arranged in the path of backward bending movement of the shank of the pin as the tip portion of the pin yields upon striking of an obstruction encountered radially of the disc, substantially the entire shank of the pin being spaced upwardly from the underside of the outer portion of the disc and generally parallel thereto so that the shank of the pin is shielded against obstructions axially engaging the underside of the disc, the pin being of sufficiently thick dimension over the shank portion that the pin is supported beam-like adjacent its head end, in radial position by the mounting means as the disc revolves during mowing free from reliance upon centrifugal force to hold the pin outwardly in cutting engagement with the grass and thus capable of performing a typical mowing operation at conventional rotative speeds on the order of 3000 rpm.

34. A safe cutter disc assembly for a rotary lawn mower having a vertical drive shaft comprising, in combination, a disc having provision for connection to the lower end of the drive shaft, the disc having an annular outer portion presenting a generally flat surface on its underside, at least one cutter pin on said disc arranged generally radially thereon, each pin being made of tough, resilient abrasion-resistant material and having a head and a shank and terminating in a long flexible tip portion, mounting means on the disc engaging and supporting the shank of each pin cantilever-fashion adjacent the head and at a region which is spaced inwardly from the periphery of the disc so that only the tip portion of the pin projects radially outwardly of the periphery for cutting of the grass as the disc is rotated, the disc having a smoothly curved backstop surface arranged in the path of backward bending movement of the shank as the tip of the pin yields upon striking an obstruction encountered radially of the disc, the backstop surface effectively terminating at a point adjacent to but spaced inwardly of the periphery of the disc so that upon striking of the radial obstruction the tip portion of the pin is free to move into the protective confines of the outer portion of the disc, the pin being of sufficiently thick dimension over the shank portion that the pin is supported beam-like adjacent its head end, in radial position by the mounting means as the disc revolves during mowing free from reliance upon centrifugal force to hold the pin outwardly in cutting engagement with the grass and thus capable of performing a typical mowing operation at conventional rotative speeds on the order of 3000 rpm.

35. A safe cutter disc assembly for a rotary lawn mower having a vertical drive shaft comprising, in combination, a disc having provision for connection to the lower end of the drive shaft, the disc having an annular outer portion presenting a shallow conical surface on its underside, at least one cutter pin on said disc arranged generally radially thereon, each pin being made of tough, resilient abrasion-resistant material and having a head and a shank and terminating in a long flexible tip portion, mounting means on the disc for engaging and supporting the shank of each pin cantilever-fashion adjacent the head and at a region which is spaced inwardly from the periphery of the disc so that only the tip portion of the pin projects radially outwardly of the periphery for cutting of the grass as the disc is rotated, the disc having a smoothly curved backstop surface arranged in the path of backward bending movement of the shank of the pin as the tip of the pin yields upon striking of an obstruction encountered radially of the disc, the backstop surface being positioned inwardly of the periphery of the disc so that upon striking of the radial obstruction the tip portion of the pin is free to move into the protective confines of the disc, substantially the entire shank of the pin being spaced upwardly from the underside of the outer portion of the disc and generally parallel thereto so that the shank of the pin is shielded against obstructions axially engaging the underside of the disc, the pin being of sufficiently thick dimension over the shank portion that the pin is supported beam-like adjacent its head end, in radial position by the mounting means as the disc revolves during mowing free from reliance upon centrifugal force to hold the pin outwardly in cutting engagement with the grass and thus capable of performing a typical mowing oepration at conventional rotative speeds on the order of 3000 rpm.

36. The combination as claimed in claim 33 in which the mounting means is arranged so as to hold each pin oriented downwardly along a shallow angle as well as outwardly so that the tips of the pins project to a level lower than the periphery of the disc to minimize the drag of the cut grass upon the lower surface of the disc.

37. The combination as claimed in claim 34 in which each pin is of tapering shape having a tip portion which is substantially thinner than the shank and is made of tough resilient abrasion-resistant plastic.

38. A safe cutter disc assembly for a rotary lawn mower having a vertical drive shaft comprising, in combination, a disc having a central portion with provision for connection to the lower end of the drive shaft and a peripheral portion presenting a generally flat surface on its underside, at least one cutter pin on said disc arranged generally radially thereon, each pin being made of tough, resilient abrasion-resistant plastic and having a head and a stiff shank and terminating in a stiffly resilient tip portion, mounting means on the disc for engaging and supporting the shank of each pin cantilever-fashion adjacent the head so that only the tip portion of the pin projects radially outwardly of the periphery for cutting of the grass as the disc is rotated, the mounting means being spaced sufficiently inwardly of the periphery so that as the pin strikes a major obstruction radially of the disc the pin may bend relatively harmlessly about its mounting means into an inwardly bent position in which the pin is increasingly shielded by the disc, and means for causing curvature to be smoothly distributed in the shank with avoidance of any sharply concentrated stress in the pin as the tip portion of the pin strikes the obstruction, substantially the entire shank of the pin being spaced upwardly from the underside of the peripheral portion of the disc and generally parallel thereto so that the shank of the pin is shielded against obstructions axially engaging the underside of the disc, the pin being of sufficiently thick dimension over the shank portion that the pin is supported beam-like adjacent its head end, in radial position by the mounting means as the disc revolves during mowing free from reliance upon centrifugal force to hold the pin outwardly in cutting engagement with the grass and thus capable of performing a typical mowing operation at conventional rotative speeds on the order of 3000 rpm.

39. The combination as claimed in claim 38 in which the pin is angled downwardly at a shallow angle so that the tip of the pin extends below the level of the disc.

* * * * *